(12) United States Patent
Tores

(10) Patent No.: US 7,472,939 B2
(45) Date of Patent: *Jan. 6, 2009

(54) DEVICE FOR TRANSMITTING A ROTATIONAL MOVEMENT BY MEANS OF A SMOOTH SHAFT

(75) Inventor: Denis Tores, Vaux le Penil (FR)

(73) Assignee: Inderflex-Technoflex, Le Chatelet en Brie (FR)

( * ) Notice: Subject to any disclaimer, the term of this patent is extended or adjusted under 35 U.S.C. 154(b) by 370 days.

This patent is subject to a terminal disclaimer.

(21) Appl. No.: 11/006,515

(22) Filed: Dec. 6, 2004

(65) Prior Publication Data

US 2005/0151045 A1 Jul. 14, 2005

Related U.S. Application Data

(63) Continuation of application No. PCT/FR2004/000597, filed on Mar. 11, 2004.

(30) Foreign Application Priority Data

Mar. 11, 2003 (FR) .................................. 03 03034

(51) Int. Cl.
 *B60N 2/02* (2006.01)
(52) U.S. Cl. .................... 296/65.15; 296/65.18; 464/58
(58) Field of Classification Search ............. 296/65.01, 296/65.12, 65.15, 65.14, 65.18; 464/52, 464/57, 58, 59; 297/1, 344.11; 248/529
 See application file for complete search history.

(56) References Cited

U.S. PATENT DOCUMENTS

| | | | |
|---|---|---|---|
| 1,568,546 A | 1/1926 | Cook | |
| 1,970,702 A | * 8/1934 | Kuney | ......................... 464/57 |
| 3,292,389 A | 12/1966 | Adloff et al. | |
| 3,389,579 A | 6/1968 | Werner et al. | |
| 3,443,307 A | 5/1969 | Werner et al. | |
| 4,915,340 A | 4/1990 | Nawa et al. | |
| 5,052,404 A | * 10/1991 | Hodgson | ..................... 600/585 |
| 5,558,578 A | 9/1996 | Uryu et al. | |
| 5,893,426 A | 4/1999 | Shimizu et al. | |
| 5,931,736 A | 8/1999 | Scherer et al. | |
| 6,038,819 A | 3/2000 | Klein | |
| 6,318,785 B1 | 11/2001 | Tousignant | |

FOREIGN PATENT DOCUMENTS

DE 200 14 561 12/2000

(Continued)

OTHER PUBLICATIONS

International Search Report for PCT/FR2004/000597 dated Sep. 17, 2004.

*Primary Examiner*—Jason S Morrow
(74) *Attorney, Agent, or Firm*—Harness, Dickey & Pierce, P.L.C.

(57) ABSTRACT

The invention concerns a device for transmitting a rotational movement comprising a flexible shaft and a sheath inside which the flexible shaft is housed, said sheath being arranged in order to allow the rotation of said shaft inside said sheath. The outer surface of the flexible shaft is machined so as to have a substantially smooth surface finish. The invention also concerns an adjustment system for a motor vehicle seat comprising such a device.

19 Claims, 3 Drawing Sheets

FOREIGN PATENT DOCUMENTS

| | | |
|---|---|---|
| EP | 1 245 434 A1 | 10/2002 |
| EP | 1 286 065 A1 | 2/2003 |
| FR | 674177 | 1/1930 |
| FR | 1266374 | 5/1961 |
| FR | 2 822 418 | 9/2002 |
| GB | 327566 | 4/1930 |
| GB | 1 203 191 | 8/1970 |
| GB | 2 176 562 A | 12/1986 |
| JP | 7-310730 | 11/1995 |
| WO | WO 92/08061 | 5/1992 |

* cited by examiner

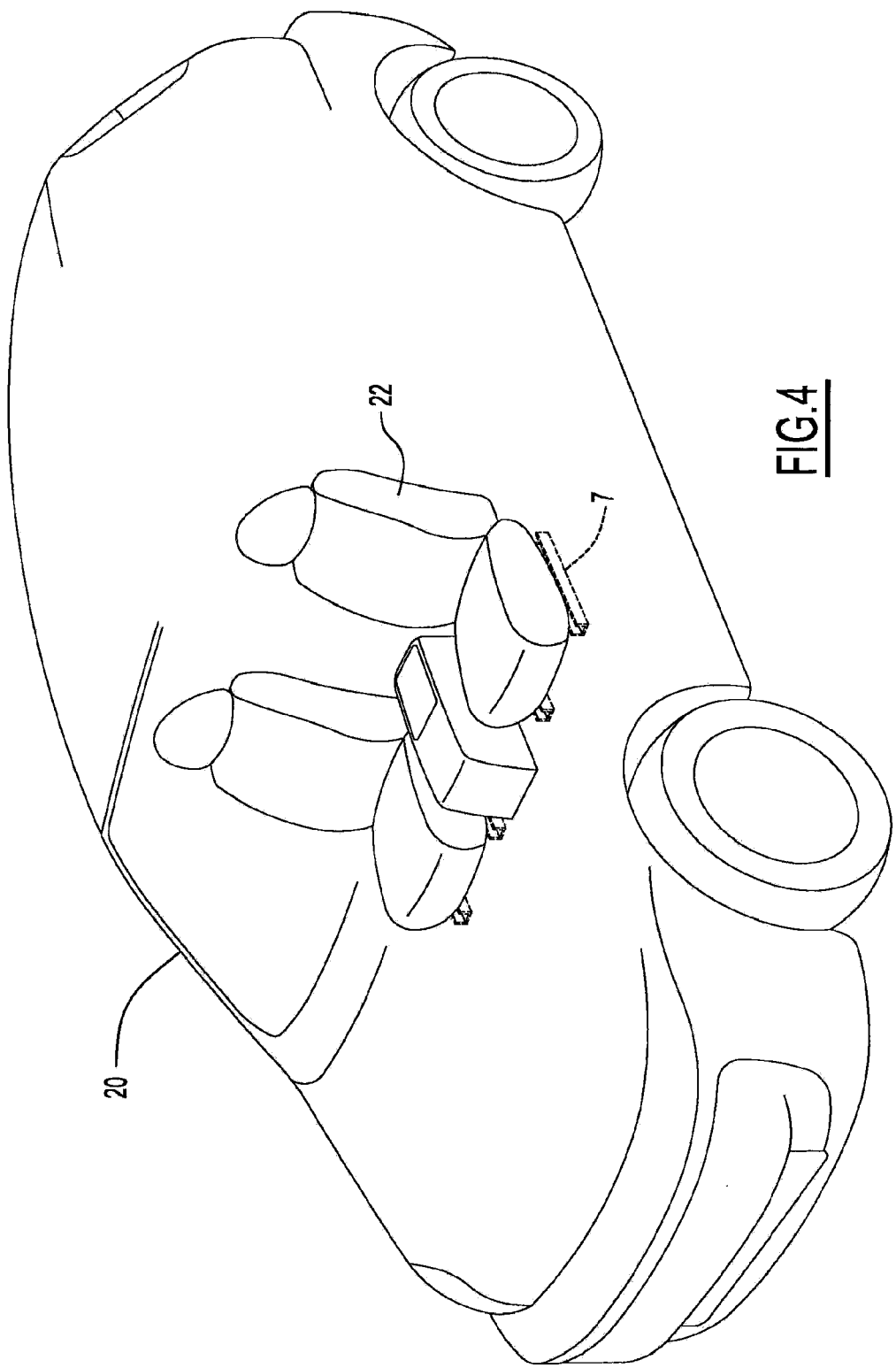

DEVICE FOR TRANSMITTING A ROTATIONAL MOVEMENT BY MEANS OF A SMOOTH SHAFT

CROSS-REFERENCE TO RELATED APPLICATIONS

This application is a continuation of Application No. PCT/FR2004/00597, filed Mar. 11, 2004, which claims priority to French Application No. 03/03034, filed Mar. 11, 2003; both of which are incorporated by reference herein.

BACKGROUND AND SUMMARY OF THE INVENTION

The invention concerns a device for transmitting a rotational movement and an adjustment system for a motor vehicle seat comprising such a device.

Rotational transmission devices are known which comprise a flexible shaft and a sheath inside which the flexible shaft is housed rotationally. In particular, the flexible shaft can consist of a metal cable. In these transmission devices, in particular for the adjustment of a seat for a motor vehicle, the speeds of rotation of the flexible shaft in the sheath are higher than 2000 revolutions/minute, conventionally of the order of 3000 revolutions/minute. During rotation at such speeds, small-amplitude vibrations appear which propagate along the flexible shaft and cause noise.

Moreover, when a lubricating substance is provided inside the sheath, the rotation of the flexible shaft brings about an Archimedes screw effect which causes the displacement of the lubricating substance to the ends of the sheath. This therefore results in a loss of efficiency of the lubrication which is detrimental to the reliability of the transmission device.

The invention aims to overcome these drawbacks by proposing a device for transmitting a rotational movement whose flexible shaft has a substantially smooth surface. This is because the applicant noted that this characteristic made it possible on the one hand to significantly reduce the vibrations caused by the rotation of the flexible shaft and on the other hand to eliminate the Archimedes screw effect. To that end and according to a first aspect, the invention concerns a device for transmitting a rotational movement comprising a flexible shaft and a sheath inside which the flexible shaft is housed, said sheath being arranged in order to allow the rotation of said shaft inside said sheath. The outer surface of the flexible shaft is machined so as to have a substantially smooth surface finish.

According to a second aspect, the invention concerns an adjustment system for a motor vehicle seat, comprising at least one adjustment runner mounted on the structure of the vehicle and adjustable means for fixing the seat to said runner, said system also comprising a drive motor having at least one revolving output, said adjustment system also comprising such a transmission device, which is disposed between the output of said drive motor and said fixing means, so as to move said fixing means along said adjustment runner in response to a rotation of said output. The invention will be better understood from a reading of the following description, given with reference to the accompanying figures.

BRIEF DESCRIPTION OF THE DRAWINGS

FIG. 4 is a schematic view in perspective of a motor vehicle having the adjustment system of FIG. 3.

DETAILED DESCRIPTION

A device 1 for transmitting a rotational movement comprises a flexible shaft 2 and a sheath 3. The flexible shaft 2 is housed in the sheath 3 whose internal diameter is provided in order to allow the rotation of the flexible shaft 2 in the sheath 3. The speeds of rotation of the flexible shaft 2 are conventionally about 3000 revolutions per minute. In order to allow a rotation at this speed, a lubricating substance 15 can be provided inside the sheath 3 so as to facilitate the rotation of the flexible shaft 2 inside said sheath.

Figure 1:
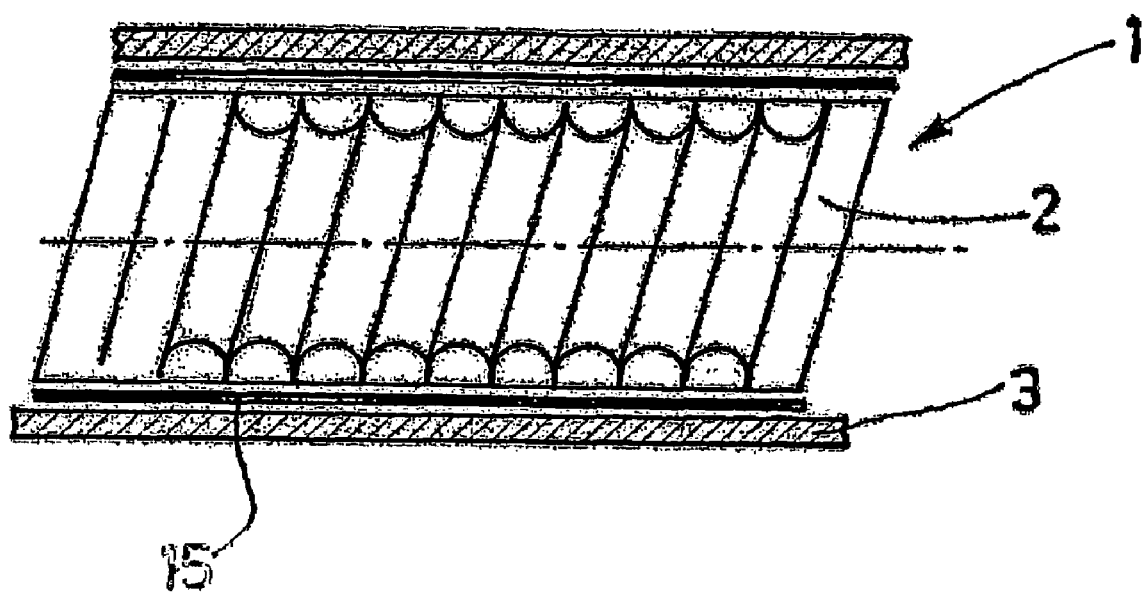
FIG. 1 is a partial schematic view in longitudinal section of a rotational transmission device, according to a first embodiment.

According to a first embodiment depicted in FIG. 1, the sheath 2 consists of a flexible tubular cover, for example made of plastic.

Figure 2:
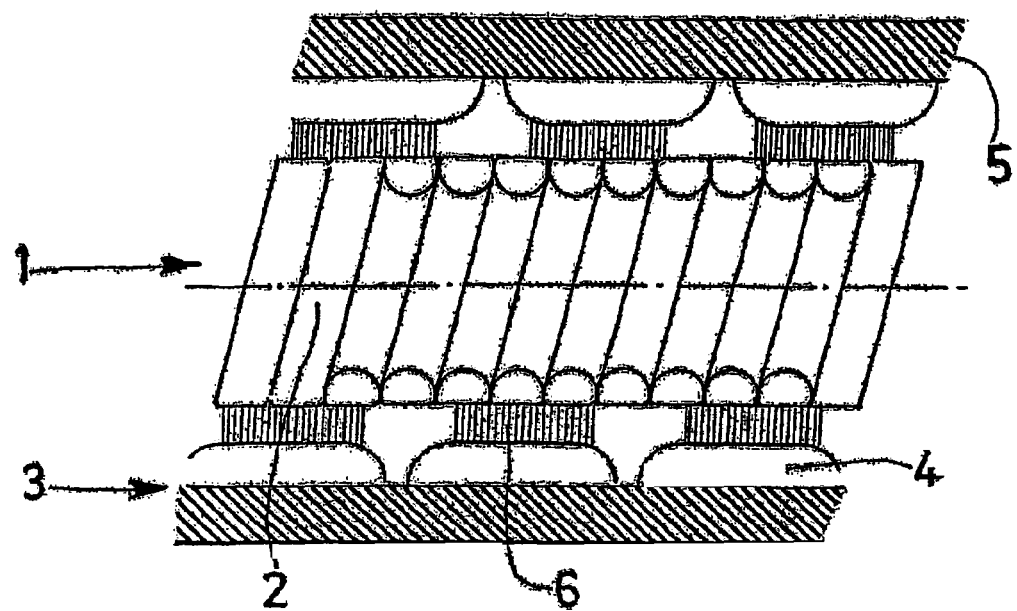
FIG. 2 is a partial schematic view in longitudinal section of a rotational transmission device, according to a second embodiment.

According to a second embodiment depicted in FIG. 2, the sheath 3 comprises a core 4 and an outer tubular cover 5 encasing the core 4. The core 4 can consist for example of a helical spring made of a metallic material. This spring is for example formed from a metal strip wound in a helix. The turns of the spring are non-contiguous which gives the sheath 3 flexibility. The outer cover 5 can be made from an extruded plastic material, for example PVC.

According to this embodiment, the core 4 of the sheath 3 comprises flocking 6 on its internal surface, that is to say on the surface facing the flexible shaft 2. To do this, the internal surface of the core 4 is coated by any known method, for example by electrostatic means, with flocking 6 which can comprise polyamide fibres 6.6. This is because it was possible to observe that such an arrangement in which the sheath 3 is flocked internally had optimum sound deadening. The flocking 6, by coming to rest on the flexible shaft 2, exerts a compressive force on said flexible shaft, which makes it possible to provide mechanical isolation between the flexible shaft 2 and the sheath 3.

Moreover, when a lubricating substance, such as grease, is inserted inside the sheath in order to lubricate the flexible shaft, the flocked sheath makes it possible to avoid leaks of grease which is displaced by the rotation of the flexible shaft, the flocking making it possible to hold back the grease. This is because, in the case of a sheath whose internal surface is smooth, leaks of grease can occur at the ends of the sheath.

The flexible shaft 2 is a cable consisting of a helical winding of several metal wires, in particular steel wires. In such an implementation, the outer surface of the cable comprises contours which are formed as a result of the use of several wires. In order to reduce the size of these contours, the outer surface of the cable is machined so as to have a substantially smooth surface finish (see the figures). In particular, grinding of the cable, prior to its disposition in the sheath 3, can be used. For example, the grinding can be carried out over a height of the order of the value of the radius of one wire. Thus, by levelling the outer wires over a distance equal to their radius, a cable is obtained whose outer surface is substantially smooth, the surface finish resembling that of a cylinder which is arranged to limit the wear of the flocking 6.

The applicant noted that the use of a flexible shaft 2 according to the invention made it possible to limit the vibration phenomenon which is brought about by the compression and relaxation of the flocking 6 during the rotation of the flexible shaft 2 against the flocking 6. Moreover, the flexible shaft 2 according to the invention makes it possible to limit the Archimedes screw phenomenon since the lubricating substance 15 is no longer driven in the sheath 3 by the contours of the outer surface of the flexible shaft 2.

Figure 3:
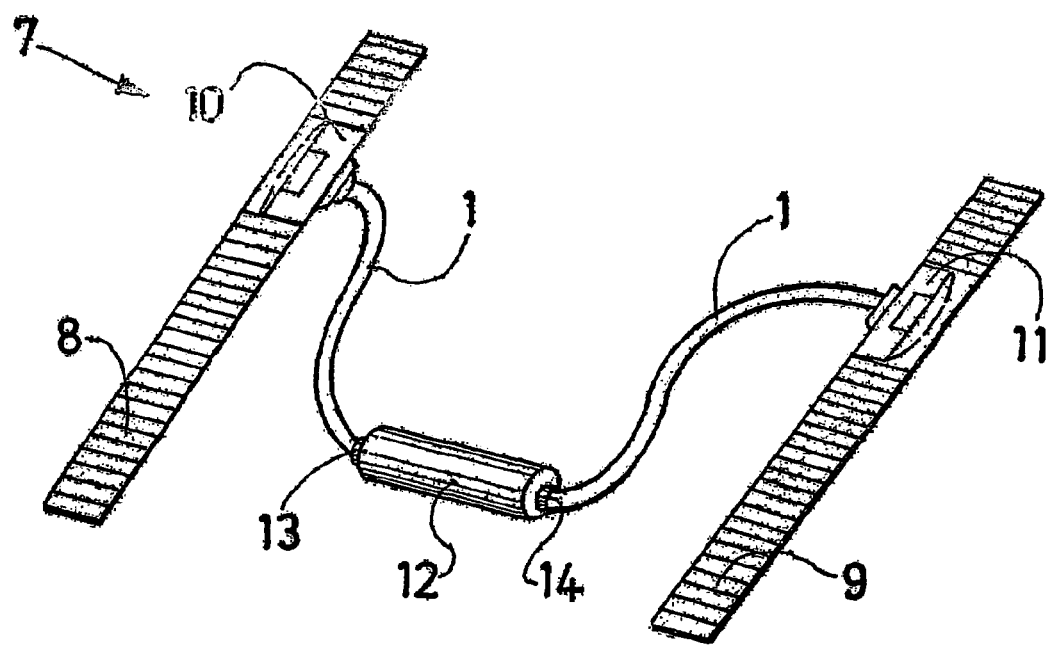
FIG. 3 is a schematic view in perspective of an adjustment system for the motor vehicle seat according to the invention.

Such a rotational movement transmission device can be used in a motor vehicle seat adjustment system 7 as depicted in FIGS. 3 and 4. To that end, two runners 8 and 9 are fixed by any suitable means to the structure, not depicted, of motor vehicle 20. These runners have adjustment notches whose function will be described below. The runners 8 and 9 support the frame of a seat 22 of the vehicle 20, whose movement and fixing with respect to the runners are provided by reduction gears 10 and 11 respectively provided with toothed wheels cooperating with the aforementioned notches of the runners 8 and 9.

An electric motor 12 is fixed to the structure of the vehicle or, in a variant, to the frame of the seat. This motor 12 has two revolving outputs 13 and 14. These outputs 13 and 14 are connected by rotational movement transmission devices 1 according to the invention to the reduction gears 10 and 11 respectively. When the motor 12 is powered, it drives the flexible shafts of the transmission devices 1 rotationally inside their sheaths. These flexible shafts in their turn drive the reduction gears 10 and 11 which has the effect of moving the seat along the runners 8 and 9.

The invention claimed is:

1. An adjustment system for a motor vehicle seat, comprising at least one adjustment runner mounted on the structure of the vehicle and adjustable means for fixing the seat to said runner, said system also comprising a drive motor having at least one revolving output, and a transmission device disposed between the output of said drive motor and said fixing means, so as to move said fixing means along said adjustment runner in response to a rotation of said output, wherein the transmission device comprises a cable including helically wound wires, an outer surface of each of the wires being substantially flat after machining.

2. A seat assembly comprising:
an adjustable seat;
an electromagnetic actuator; and
a cable operably moved by the actuator to move the seat, the cable comprising a flexible shaft and a sheath inside which the shaft operably rotates, the shaft comprising a cable including a winding of metal wires wherein an outer surface of each of the wires is substantially flat after machining, the shaft having a substantially smooth finish.

3. The assembly according to claim 2, wherein the cable comprises flocking.

4. The assembly according to claim 3, further comprising a lubricant held by the flocking.

5. The assembly according to claim 2, wherein the cable comprises a flexible core around which is helically wound the wires, the sheath being a plastic tubular material.

6. The assembly according to claim 2, wherein the smooth finish of the cable substantially eliminates rotational vibrations and substantially eliminates an Archimedes screw effect.

7. The assembly according to claim 2, wherein the seat is an automotive vehicle seat and the actuator is an electric motor.

8. The assembly according to claim 2, wherein the cable rotates at about three thousand revolutions per minute within the sheath in at least one operating condition.

9. The assembly according to claim 2, wherein an opposite inner surface of each of the wires is curved.

10. The assembly according to claim 1, wherein an opposite inner surface of each of the wires is curved.

11. A seat apparatus comprising:
an adjustable seat;
an automatic actuator; and
a cable operably rotated by the actuator to move the seat, the cable having a plurality of helically wound wires wherein an outer surface of the cable is substantially flat after machining.

12. The seat apparatus of claim 11 wherein and an opposite inner surface of the cable is curved.

13. The apparatus according to claim 11, wherein the cable comprises flocking.

14. The apparatus according to claim 13, further comprising a lubricant held by the flocking.

15. The apparatus according to claim 14, wherein the cable comprises a flexible core around which is helically wound at least one metal strip.

16. The apparatus according to claim 11, wherein the substantially smooth outer surface substantially eliminates rotational vibrations and substantially eliminates an Archimedes screw effect.

17. The apparatus according to claim 11, wherein the seat is an automotive vehicle seat and the actuator is an electric motor.

18. The apparatus according to claim 11, further comprising an elongated sheath, the cable rotating at about three thousand revolutions per minute within the sheath in at least one operating condition.

19. The apparatus according to claim 11, further comprising a runner having notches, and at least one gear driven by the cable, the gear engagably moving between the notches to adjust the seat relative to the runner.

* * * * *